(12) United States Patent
Semura et al.

(10) Patent No.: US 6,509,130 B1
(45) Date of Patent: Jan. 21, 2003

(54) RESIN BINDER COMPOSITION FOR NON-CONTACT FIXING PROCESS

(75) Inventors: Tetsuhiro Semura, Wakayama (JP); Yoshihiro Ueno, Wakayama (JP)

(73) Assignee: Kao Corporation, Tokyo (JP)

( * ) Notice: Subject to any disclaimer, the term of this patent is extended or adjusted under 35 U.S.C. 154(b) by 36 days.

(21) Appl. No.: 09/670,866

(22) Filed: Sep. 27, 2000

(30) Foreign Application Priority Data

Sep. 27, 1999 (JP) .......................................... 11-273182

(51) Int. Cl.$^7$ ........................ G03G 9/087; G03G 13/20; C08L 67/02
(52) U.S. Cl. ...................... 430/109.4; 430/124; 525/444
(58) Field of Search ....................... 525/444; 430/109.4, 430/124

(56) References Cited

U.S. PATENT DOCUMENTS

| | | | | |
|---|---|---|---|---|
| 5,330,870 A | * | 7/1994 | Tanaka | ........................ 430/109 |
| 5,501,931 A | * | 3/1996 | Hirama | ....................... 430/109 |
| 5,660,963 A | * | 8/1997 | Doujo | ........................ 430/107 |

FOREIGN PATENT DOCUMENTS

| | | |
|---|---|---|
| JP | 05107805 A | 4/1993 |
| JP | 08087130 A | 4/1996 |

* cited by examiner

*Primary Examiner*—Patricia A. Short
(74) *Attorney, Agent, or Firm*—Birch, Stewart, Kolasch & Birch, LLP

(57) ABSTRACT

A resin binder composition for a non-contact fixing process comprising two or more polyesters having different softening points, wherein the polyesters comprise at least one polyester having a softening point of 80° C. or more and less than 120° C. (low-softening point polyester), and at least one polyester having a softening point of 120° C. or more and 160° C. or less (high-softening point polyester), wherein each of said polyesters is obtained from a carboxylic acid component consisting essentially of an aromatic carboxylic acid compound, and wherein the high-softening point polyester is a cross-linked polyester; a toner for a non-contacting fixing process comprising the resin binder composition, and a developer comprising the toner for a non-contacting fixing process; and a method for fixing the toner in a non-contact fixing process.

8 Claims, No Drawings

RESIN BINDER COMPOSITION FOR NON-CONTACT FIXING PROCESS

BACKGROUND OF THE INVENTION

1. Field of the Invention

The present invention relates to a resin binder composition for a non-contact fixing process used for developing electrostatic latent images formed in electrophotography, electrostatic recording method, electrostatic printing, and the like, a toner for a non-contact fixing process comprising the resin binder composition, a developer comprising the toner for a non-contact fixing process, and a method for fixing the toner in a non-contact fixing process.

2. Discussion of the Related Art

A non-contact fixing process includes a process in which light or heat energy is applied to a toner in a non-contacting state, thereby fixing the toner, such as a flash fixing or radiant (oven) fixing process, which has a feature in that the offset phenomenon and the deterioration of resolution, which are often found in contact-fixing, are not found. However, when the light or heat energy is deficient during fixing, the toner cannot be sufficiently melted, so that satisfactory fixing ability cannot be obtained. On the other hand, when the light or heat energy is too intensive, the viscosity of the toner drastically is lowered. When the surface tension acting on the toner exceeds the viscosity, the aggregation and migration of the toner at printed portion take place, so that there is generated a so-called "voids," which are white voids phenomenon on a fixed image, whereby the photographic density of the image is lowered. Therefore, toners using a specific resin binder are disclosed in Japanese Patent Laid-Open Nos. Hei 8-87130, Hei 5-107805, and the like, in view of eliminating these defects found in the non-contacting fixing process. However, further improvements in the environmental resistance and the storage ability are desired, even though the fixing ability and the void resistance are somewhat improved.

An object of the present invention is to provide a resin binder composition for a non-contact fixing process which suppresses unpleasant odor generated during non-contact fixing process, and is excellent in the fixing ability and the void resistance.

Another object of the present invention is to provide a toner for a non-contacting fixing process comprising the resin binder composition, and a developer comprising the toner for a non-contacting fixing process.

Still another object of the present invention is to provide a method for fixing the toner in a non-contact fixing process.

These objects and other objects of the present invention will be apparent from the following description.

SUMMARY OF THE INVENTION

The present invention pertains to the following:

[1] a resin binder composition for a non-contact fixing process comprising two or more polyesters having different softening points, wherein the polyesters comprise at least one polyester having a softening point of 80° C. or more and less than 120° C. (low-softening point polyester), and at least one polyester having a softening point of 120° C. or more and 160° C. or less (high-softening point polyester), wherein each of the polyesters is obtained from a carboxylic acid component consisting essentially of an aromatic carboxylic acid compound, and wherein the high-softening point polyester is a cross-linked polyester;

[2] a toner for a non-contact fixing process comprising the resin binder composition as defined above;

[3] a developer comprising the toner as defined above; and

[4] a method for fixing a toner in a non-contact fixing process, comprising applying the toner to a fixing device, wherein the toner comprises the resin binder composition defined above.

DETAILED DESCRIPTION OF THE INVENTION

The resin binder composition for a non-contact fixing process of the present invention comprises two or more polyesters having different softening points, wherein the polyesters comprise at least one polyester having a softening point of 80° C. or more and less than 120° C. (low-softening point polyester), and at least one polyester having a softening point of 120° C. or more and 160° C. or less (high-softening point polyester). Since the polyesters having different softening points are contained as mentioned above, the molecular weight distribution of the resin binder composition becomes wider, so that the generation of voids found generally in the non-contacting process can be effectively prevented, whereby the fixing ability can be improved. The resin binder composition of the present invention can be especially preferably used as a resin binder composition for flash fixing process among the non-contact fixing processes such as flash fixing or radiant (oven) fixing processes, from the viewpoint of energy efficiency.

A further great feature of the present invention resides in that all of the polyesters are obtained from a carboxylic acid component consisting essentially of an aromatic carboxylic acid compound. Since the aromatic carboxylic acid compound is used as a carboxylic acid component, the unpleasant odor during toner fixing can be suppressed. Here, the phrase "consisting essentially of an aromatic carboxylic acid compound" means that other compounds may be slightly contained in an amount so as not to hinder the object of the present invention.

As the polyesters usable in the present invention, the low-softening point polyester may be either a linear polyester or a cross-linked polyester, as long as the high-softening point polyester is a cross-linked polyester. The low-softening point polyester is preferably a linear polyester, from the viewpoint of the fixing ability.

Therefore, the polyester usable in the present invention is obtained by polycondensation of an alcohol component with a carboxylic acid component consisting essentially of an aromatic carboxylic acid compound as mentioned above. As the carboxylic acid component, aromatic dicarboxylic acid compounds may be used for the linear polyesters, and aromatic tricarboxylic or higher polycarboxylic acid compounds as well as the aromatic dicarboxylic acid compounds may be used for cross-linked polyesters.

The preferable aromatic dicarboxylic acid compound includes phthalic acid compounds such as phthalic acid, isophthalic acid, and terephthalic acid, acid anhydrides thereof, alkyl(1 to 8 carbon atoms) esters thereof, and the like. These aromatic dicarboxylic acid compounds may be used alone or in admixture of two or more kinds.

The aromatic tricarboxylic or higher polycarboxylic acid compound includes trimellitic acid, pyromellitic acid, acid anhydrides thereof, alkyl(1 to 8 carbon atoms) esters thereof, and the like. Among them, trimellitic acid anhydride is preferable.

In the cross-linked polyester, the aromatic tricarboxylic or higher polycarboxylic acid compound is contained in an amount of preferably from 3 to 40% by mol, more preferably from 5 to 25% by mol, of the carboxylic acid component.

The alcohol component includes bisphenol A of an alkylene (2 to 3 carbon atoms) oxide adduct, each having average moles added of 1 to 16, such as polyoxypropylene (2.2)-2,2-bis(4-hydroxyphenyl)propane and polyoxyethylene(2.2)-2,2-bis(4-hydroxyphenyl)propane; ethylene glycol, propylene glycol, neopentyl glycol, glycerol, pentaerythritol, trimethylolpropane, sorbitol, alkylene (2 to 3 carbon atoms) oxide adducts thereof, each having average moles added of 1 to 16. These alcohol components may be used alone or in combination of two or more kinds. Especially, from the viewpoint of improving the durability of the toner, in each of the linear polyester and the cross-inked polyester, it is desirable that the compound represented by the formula (I):

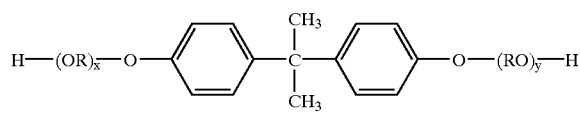

(I)

wherein R is an alkylene group having 2 or 3 carbon atoms; each of x and y is a positive number, wherein a sum of x and y is from 1 to 16, preferably from 1.5 to 5.0, constitutes 5% by mol or more, preferably 50% by mol or more, more preferably 100% by mol of the alcohol component.

The polycondensation of the alcohol component with the carboxylic acid component is carried out, for instance, by the reaction at a temperature of from 180° to 250° C. in an inert gas atmosphere, using an esterification catalyst as occasion demands.

It is desired that the softening point of the low-softening point polyester is 80° C. or more and less than 120° C., preferably 95° C. or more and 110° C. or less, and that the softening point of the high-softening point polyester is 120° C. or more and 160° C. or less, preferably 130° C. or more and 160° C. or less, from the viewpoint of the fixing ability. In addition, the glass transition temperature of the low-softening point polyester is preferably 50° C. or more, more preferably 60° C. or more, and from the viewpoint of the storage stability, the glass transition temperature is more preferably 80° C. or less. Therefore, the glass transition temperature is preferably from 50° to 80° C., more preferably from 60° to 80° C. Also, the glass transition temperature of the high-softening point polyester is preferably 55° C. or more, more preferably from 60° to 80° C.

The weight ratio of the low-softening point polyester to the high-softening point polyester (low-softening point polyester/high-softening point polyester) is preferably from 20/80 to 90/10, more preferably from 40/60 to 90/10.

The toner for a non-contact fixing process of the present invention comprises the resin binder composition of the present invention explained above, which may further comprise in appropriate amounts additives such as a colorant, a charge control agent, a releasing agent, an electric conductivity modifier, an extender, a reinforcing filler such as a fibrous substance, an antioxidant, an anti-aging agent, a fluidity improver, and a cleanability improver.

As the colorants, all of the dyes and pigments which are used as conventional colorants for toners can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants may be used alone or in admixture of two or more kinds. The colorant is contained in an amount of preferably from 1 to 10 parts by weight, based on 100 parts by weight of the resin binder composition.

The toner of the present invention is not particularly limited, and includes pulverized toners, polymerization toners, encapsulated toners, and the like, preferably a pulverized toner obtained by kneading and pulverization method. As a general method, for instance, a resin binder, a colorant, and the like are homogeneously blended in a mixer such as a ball-mill, and thereafter the mixture is melt-kneaded by a seal-type kneader or a single-screw or twin-screw extruder, or the like, and the kneaded mixture is cooled, pulverized, and classified. Further, a fluidity improver or the like may be added to the toner surface as occasion demands. It is preferable that the toner obtained as described above has a weight-average particle size of from 3 to 15 μm.

The toner for a non-contact fixing process of the present invention may be used alone as a developer when a magnetite particulate is contained, or as a nonmagnetic one-component developer when a fine magnetite particulate is not contained, or as a two-component developer by mixing the toner with a carrier.

This toner can be suitably used for a fixing device utilizing a non-contact fixing process. The present invention also provides a method for fixing a toner utilizing the non-contact fixing process, preferably a flash fixing process.

EXAMPLES

Softening Point of Resin

The temperature at which one-half of resin flows out, when measured by using a flow tester of the "koka" type (Model "CFT-500D" manufactured by Shimadzu Corporation) [sample: 1 g, heating rate: 6° C./min, applied load: 1.96 MPa, nozzle: 1 mm diameter and a length of 1 mm].

Glass Transition Temperature of Resin

Determined at a heating rate of 10° C./min by using a differential scanning calorimeter ("DSC Model 210," manufactured by Seiko Instruments, Inc.).

Preparation Example for Polyesters

A 3-liter four-necked glass flask was charged with raw materials shown in Table 1 or 2 together with dibutyltin oxide as an esterilication catalyst, and a thermometer, a stainless stirrer, a reflux condenser and a nitrogen inlet tube were attached thereto. The contents in the flask were heated in an electric mantle at 200° C. under nitrogen gas stream with stirring, and reacted with a softening point as determined by ring-ball method as a tentative termination point, to give Resins A to F (linear polyesters) and Resins a to h (cross-linked polyesters). The softening point (Tm) and the glass transition temperature (Tg) for each resin are shown in Tables 1 and 2.

TABLE 1

|  | Resin A | Resin B | Resin C | Resin D | Resin E | Resin F |
|---|---|---|---|---|---|---|
| BPA-PO[1] | 80 | 90 | 80 | 95 | 95 |  |
| BPA-EO[2] | 20 | 5 | 15 | 5 | 5 | 20 |
| Ethylene Glycol |  |  |  |  |  | 80 |
| Propylene Glycol |  |  |  | 5 |  |  |
| Neopentyl Glycol |  | 5 |  |  |  |  |
| Isophthalic Acid | 70 | 40 | 70 | 25 | 20 | 65 |
| Dimethyl Terephthalate | 20 | 40 | 10 | 70 | 70 | 20 |
| Fumaric Acid |  |  |  |  | 10 | 5 |
| Tm (° C.) | 108.2 | 99.5 | 85.2 | 123.5 | 123.2 | 108.2 |
| Tg (° C.) | 70.2 | 53.2 | 55.2 | 62.5 | 62.3 | 56.5 |

[1]Propylene oxide adduct of bisphenol A (average number of moles added: 2.2 moles).
[2]Ethylene oxide adduct of bisphenol A (average number of moles added: 2.2 moles).
Remark: All amounts of the raw materials used are expressed in molar ratios.

TABLE 2

|  | Resin a | Resin b | Resin c | Resin d | Resin e | Resin f | Resin g | Resin h |
|---|---|---|---|---|---|---|---|---|
| BPA-PO[1] | 85 | 70 | 40 |  | 90 | 90 | 15 | 70 |
| BPA-EO[2] | 15 | 30 | 15 |  | 10 | 10 | 5 | 30 |
| Ethylene Glycol |  |  | 10 | 10 |  |  | 40 |  |
| Propylene Glycol |  |  |  |  |  |  | 40 |  |
| Neopentyl Glycol |  |  | 35 | 90 |  |  |  |  |
| Isophthalic Acid | 65 | 65 | 80 | 10 | 70 | 72 | 45 | 45 |
| Dimethyl Terephthalate | 10 | 5 | 30 | 80 | 10 | 9 | 30 | 35 |
| Trimellitic Anhydride | 18 | 16 | 20 | 10 | 10 | 8 | 20 | 10 |
| Fumaric Acid |  |  |  |  |  |  | 5 | 10 |
| Tm (° C.) | 155.2 | 149.8 | 144.5 | 131.2 | 121.5 | 92.1 | 122.2 | 120.5 |
| Tg (° C.) | 63.2 | 67.2 | 65.3 | 63.2 | 64.5 | 55.2 | 57.2 | 59.2 |

[1]Propylene oxide adduct of bisphenol A (average number of moles added: 2.2 moles).
[2]Ethylene oxide adduct of bisphenol A (average number of moles added: 2.2 moles).
Remark:
All amounts of the raw materials used are expressed in molar ratios.

Examples 1 to 10 and Comparative Examples 1 to 7

One-hundred parts by weight of a resin binder composition composed of the resins listed in Table 3 as resin binders, 7 parts by weight of carbon black "#44" (manufactured by Mitsubishi Kasei Corporation) as a colorant, and 3 parts by weight of "Bontron N-01" (manufactured by Orient Chemical Co., Ltd.) as a positively chargeable charge controlling agent were sufficiently mixed with a Henschel mixer. Thereafter, the mixture was melt-kneaded with a twin-screw extruder, and after cooling the mixture, the mixture was pulverized and classified, to give each toner having a weight-average particle size of 11 μm.

Example 11

The same procedures as in Example 1 were carried out except that the resin binder composition composed of the resins listed in Table 3 as a resin binder, and that 3 parts by weight of "Bontron S-34" (manufactured by Orient Chemical Co., Ltd.) as a negatively chargeable charge controlling agent was used in place of the positively chargeable charge controlling agent, to give a toner having a weight-average particle size of 11 μm.

Test Example 1

A developer was prepared by mixing 4 parts by weight of each of the resulting toners with 96 parts by weight of "TEFV 200/300" (iron powder, commercially available from Powder Tech Kabushiki Kaisha) as a carrier. The resulting developer was loaded on a commercially available laser printer employing flash fixing process to develop images. The unpleasant odor, the fixing ability and the void resistance were evaluated by the following methods. The results are shown in Table 3.

(1) Unpleasant Odor

Continuous printing was carried out for 300 sheets, and an unpleasant odor was smelled 10 cm away from the fixing device. The unpleasant odor was evaluated in accordance with the following evaluation criteria:

[Evaluation Criteria]

○: Only 2 or less persons out of 10 persons smell the unpleasant odor.

x: Three or more persons out of 10 persons smell the unpleasant odor.

(2) Fixing Ability

The fixing ratio was determined by placing a load of 500 g on a sand-rubber eraser having a bottom area of 15 mm×7.5 mm on an initial fixed image obtained by fixing at a fixing speed of 100 mm/seconds at a temperature of 180° C., moving the loaded eraser on the image backward and forward five times, measuring the optical reflective density of the image before or after the eraser treatment with a reflective densitometer "RD-915" manufactured by Macbeth Process Measurements Co., and then calculating the fixing ratio by the following equation.

$$\text{Fixing Ratio} = \frac{\text{Optical Density After Eraser Treatment}}{\text{Optical Density Before Eraser Treatment}} \times 100$$

The fixing ability was evaluated in accordance with the following evaluation criteria:

[Evaluation Criteria]

⊚: The fixing ratio exceeding 80%;

○: The fixing ratio being from 70 to 80%, inclusive.

x: The fixing ratio being less than 70%.

(3) Void Resistance

The generation of voids caused by explosive fixing was observed with naked eyes, and evaluated in accordance with the following evaluation criteria:

[Evaluation Criteria]

○: No generation of voids x: Generation of voids found

TABLE 3

| Ex. No. | Resins and Amount Used | Unpleasant Odor | Fixing Ability | Void Resistance |
|---|---|---|---|---|
| 1 | Resin A/50 Resin b/50 | ○ | ⊚ | ○ |
| 2 | Resin C/50 Resin b/50 | ○ | ⊚ | ○ |
| 3 | Resin B/50 Resin b/50 | ○ | ⊚ | ○ |
| 4 | Resin f/50 Resin b/50 | ○ | ○ | ○ |
| 5 | Resin f/90 Resin b/10 | ○ | ⊚ | ○ |
| 6 | Resin f/20 Resin b/80 | ○ | ○ | ○ |
| 7 | Resin B/30 Resin e/70 | ○ | ○ | ○ |
| 8 | Resin B/55 Resin a/45 | ○ | ⊚ | ○ |
| 9 | Resin B/70 Resin c/30 | ○ | ⊚ | ○ |
| 10 | Resin A/50 Resin d/50 | ○ | ⊚ | ○ |
| 11 | Resin A/50 Resin d/50 | ○ | ⊚ | ○ |
| Comp. Ex. No. | | | | |
| 1 | Resin E/50 Resin h/50 | x | x | ○ |
| 2 | Resin F/50 Resin c/50 | x | ⊚ | ○ |
| 3 | Resin B/50 Resin g/50 | x | ○ | ○ |
| 4 | Resin B/100 | ○ | x | x |

TABLE 3-continued

| | Resins and Amount Used | Unpleasant Odor | Fixing Ability | Void Resistance |
|---|---|---|---|---|
| 5 | Resin b/100 | ○ | x | ○ |
| 6 | Resin E/50 Resin c/50 | x | x | ○ |
| 7 | Resin B/60 Resin D/40 | ○ | x | x |

Remark) Amount used in expressed by parts by weight.

It is clear from the above results that the toners of Examples 1 to 11 substantially have no unpleasant odor during heating, are excellent in the fixing ability and void resistance. On the other hand, the toners of Comparative Examples 1 to 3 where an aliphatic carboxylic acid compound other than the aromatic carboxylic acid compounds is used as a carboxylic acid component generated unpleasant odor; the toners of Comparative Examples 4 and 5 where a resin binder composition composed of a single resin is used have impaired fixing ability and/or void resistance; and the toner of Comparative Example 6 where both the linear polyester and the cross-linked polyester are used for the high-softening point polyesters generated unpleasant odor, and are also deficient in the fixing ability; and the toner of Comparative Toner 7 where a cross-linked polyester is not used is poor in the fixing ability and the void resistance.

According to the present invention, there can be provided a resin binder composition for a non-contact fixing process which suppresses unpleasant odor generated during non-contact fixing process, and is excellent in the fixing ability and the void resistance; a toner for a non-contact fixing process comprising such a resin binder composition; a developer comprising such a toner, and a method for fixing the toner in a non-contact fixing process.

| | Low-Softening Point Polyester | | | High-Softening Point Polyester | | | | Void Resistance | |
|---|---|---|---|---|---|---|---|---|---|
| Ex. No. | Type | Tm | Ratio | Type | TMA (mol %) | Tm | Ratio | Original | New |
| 1 | A | 108 | 50 | b | 16 | 150 | 50 | ○ | A |
| 2 | C | 85.2 | 50 | b | 16 | 150 | 50 | ○ | A |
| 3 | B | 99.5 | 50 | b | 16 | 150 | 50 | ○ | A |
| 4 | f | 92.1 | 50 | b | 16 | 150 | 50 | ○ | A |
| 5 | f | 92.1 | 90 | b | 16 | 150 | 10 | ○ | B |
| 6 | f | 92.1 | 20 | b | 16 | 150 | 80 | ○ | A |
| 7 | B | 99.5 | 30 | e | 10 | 122 | 70 | ○ | C |
| 8 | B | 99.5 | 55 | a | 18 | 155 | 45 | ○ | A |
| 9 | B | 99.5 | 70 | c | 20 | 145 | 30 | ○ | B |
| 10 | A | 108 | 50 | d | 10 | 131 | 50 | ○ | B |
| 11 | A | 108 | 50 | d | 10 | 131 | 50 | ○ | B |
| Comp. Ex.No | | | | | | | | | |
| 1 | E | 123 | 50 | h | 10 | 121 | 50 | ○ | C |
| 2 | F | 108 | 50 | c | 20 | 145 | 50 | ○ | A |
| 3 | B | 99.5 | 50 | g | 20 | 122 | 50 | ○ | C |
| 4 | B | 99.5 | 100 | — | | | | x | E |
| 5 | — | | | b | 16 | 150 | 100 | ○ | A |
| 6 | E | 123 | 50 | c | 20 | 145 | 50 | ○ | A |
| 7 | B | 99.5 | 60 | D | 0 | 124 | 40 | x | E |
| A | — | | | I | 15 | 120 | 100 | ○ | C |
| B | B | 99.5 | 30 | D | 0 | 124 | 70 | x | D |

New evaluation criteria are as follows:
A: No generation of voids is detected.
B: Very few voids are generated, without lowering the optical density.

| | Low-Softening Point Polyester | | | High-Softening Point Polyester | | | | Void Resistance | |
|---|---|---|---|---|---|---|---|---|---|
| Ex. No. | Type | Tm | Ratio | Type | TMA (mol %) | Tm | Ratio | Original | New |

C: Voids are slightly generated, tending to lower the optical density or the like.
D: Voids are generated, thereby lowering the optical density.
E: Considerable amount of voids is generated, thereby notably lowering the optical density, resulting in worsened image quality.

What is claimed is:

1. A resin binder composition for a non-contact fixing process comprising two or more polyesters having different softening points, wherein the polyesters comprise at least one polyester having a softening point of 80° C. or more and less than 120° C. (low-softening point polyester), and at least one polyester having a softening point of 130° C. or more and 160° C. or less (high-softening point polyester), wherein each of said polyesters is obtained from a carboxylic acid component consisting essentially of an aromatic carboxylic acid compound, and wherein the high-softening point polyester is a cross-linked polyester.

2. The resin binder composition according to claim 1, wherein a weight ratio of a low-softening point polyester to a high-softening point polyester (low-softening point polyester/high-softening point polyester) is from 20/80 to 90/10.

3. The resin binder composition according to claim 1, wherein said aromatic carboxylic acid compound is at least one compound selected from the group consisting of phthalic acid compounds and triellitic acid anhydride.

4. The resin binder composition according to claim 1, wherein said non-contact fixing process is a flash fixing process.

5. A toner for a non-contact fixing process comprising the resin binder composition as defined in any one of claims 1 to 4.

6. A developer comprising the toner as defined in claim 5.

7. A method for fixing a toner in a non-contact fixing process, comprising applying the toner to a fixing device, wherein the toner comprises a resin binder composition comprising two or more polyesters having different softening points, wherein the polyesters comprise at least one polyester having a softening point of 80° C.; or more and less than 120° C. (low-softening point polyester), and at least one polyester having a softening point of 130° C. or more and 160° C. or less (high-softening point polyester), wherein each of said polyesters is obtained from a carboxylic acid component consisting essentially of an aromatic carboxylic acid compound, and wherein the high-softening point polyester is a cross-linked polyester.

8. The method according to claim 7, wherein said non-contact fixing process is a flash fixing process.

* * * * *